(No Model.)
C. A. HOLMES.
ERASER HOLDER.
No. 408,305. Patented Aug. 6, 1889.
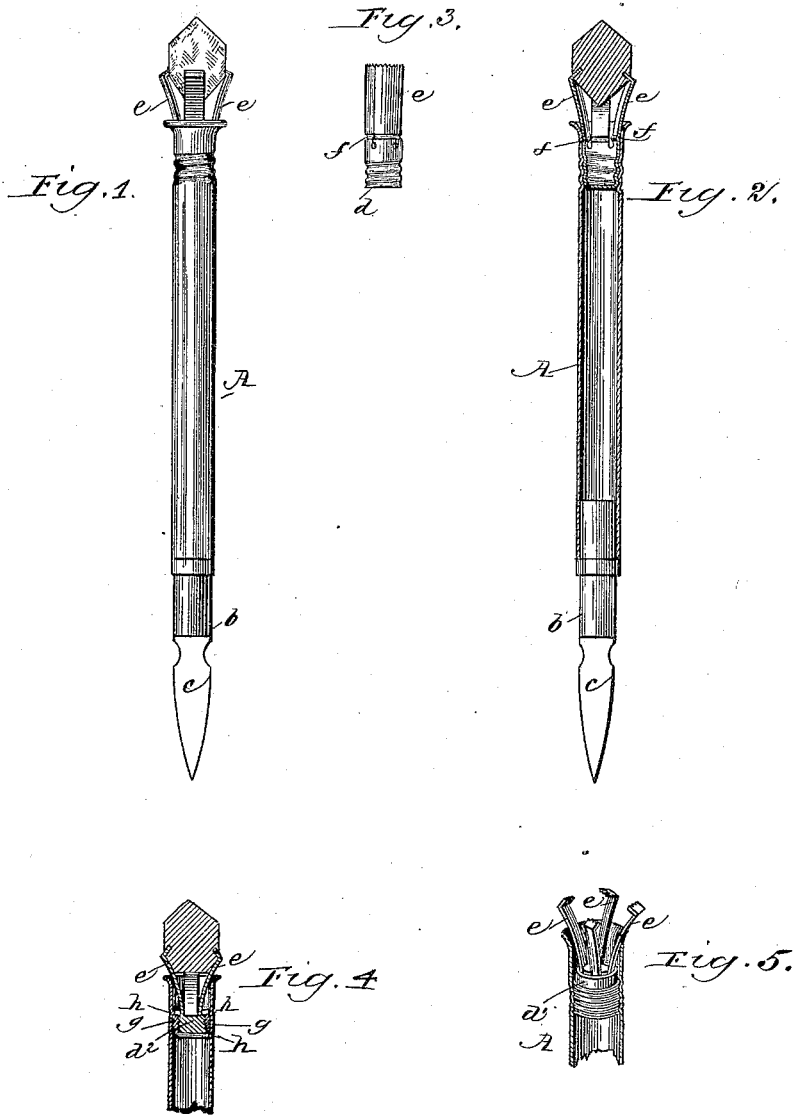

UNITED STATES PATENT OFFICE.

CHARLES A. HOLMES, OF IRVING PARK, ILLINOIS.

ERASER-HOLDER.

SPECIFICATION forming part of Letters Patent No. 408,305, dated August 6, 1889.

Application filed April 9, 1889. Serial No. 306,566. (No model.)

*To all whom it may concern:*

Be it known that I, CHARLES A. HOLMES, residing at Irving Park, in the county of Cook and State of Illinois, have invented certain new and useful Improvements in Eraser-Holders, of which the following is hereby declared to be a full, clear, and exact description, sufficient to enable others skilled in the art to which said invention appertains to make and use the same.

The invention relates to eraser-holders, and more especially to such wherein the rubber or like erasive tip is tightly held in the grasp of spring-fingers which project beyond the end of a tubular body or support.

According to the present improvement, the grip of the fingers upon the erasive material is regulated at will by means of the threaded engagement of the tubular support with the inner screw-plug or spindle which carries the spring-fingers. Owing to such screw adjustment the tube is brought to bear more or less tightly against the fingers, (which it encompasses in part,) thus closing or relaxing the grasp of the fingers upon the rubber tips, as desired.

The invention comprises also certain improvements in detail structure, the nature of all of which will fully appear from the description following, and be hereinafter more distinctly pointed out by claims at the conclusion thereof.

Figure 1 is a view of the improved eraser-holder in side elevation. Fig. 2 is a longitudinal sectional view of the same. Figs. 3, 4, and 5 are detail views of various forms of screw-spindle furnished with the spring-fingers.

The tubular body or support A of the holder is formed of metal or other suitable material, and is preferably open at both of its ends. One end or terminal of the holder serves to receive and seat therein the plug or socket-piece $b$, which is furnished with the knife-eraser $c$ set rigidly therein. Instead of the eraser $c$, the plug $b$ may be furnished with some other tool convenient for use, or such plug may be omitted entirely and the open end of the holder A be adapted to receive at will either end of a pencil or the like.

The opposite terminal of the tube or holder proper is designed to receive the spindle $d$, which carries the series of spring-fingers $e$. The spindle $d$ is preferably made tube-like in form and split from one of its ends for some distance along the length of the tube, thus producing spring-fingers $e$ in piece with the body of the spindle. A knurl or indent $f$ is made around the spring-fingers $e$, near their point of junction with the body of the spindle $d$, whereby the fingers are made to flare slightly, thus admitting erasers of various sizes between them, and allowing for greater latitude in the gripping movements. The tubular end of the spindle $d$ is threaded, as shown, to engage with the corresponding thread formed upon the terminal of the tubular support A. By reason of such screw-connection the spindle $d$ may be readily adjusted up and down within the tubular holder, so that the end of such holder is made to bear more or less tightly against the flaring fingers $e$ to regulate the clasp thereof upon the erasive tip.

Instead of making the spring-fingers E in piece with the tubular spindle $d$, as preferred, such fingers may be separately set in a threaded plug or socket, as at $d'$, Fig. 5, which plug engages with the threaded terminal of the main support A; or, again, such tubular support, instead of being threaded, may have the screw-nut $g$ secured therein between the knurls $h$ or like expedient, (see Fig. 4,) and the threaded spindle $d^2$, carrying the spring-fingers, be adjusted up and down in said nut. By either construction the bearing of the tubular support or body of the holder against the spring-fingers, which clasp the erasive tip, can be varied or relaxed at will to hold the rubber, shift its position, or replace it entirely, as may be desired.

Heretofore holders for sponge-erasers had been devised wherein the spring-fingers projecting from a tubular shank were compressed or released at will by means of a slip-ring which encompassed the fingers; but in such construction there was no tubular receiver to seat the shank, as in my device, nor any threaded engagement between the receiver and shank, whereby the receiver could be made to bear adjustably against the spring-fingers to nicely regulate the grip thereof, the slip-ring was not screw-threaded, nor did it sustain the shank of the fingers, as with my tubular receiver. A tubular holder having threaded terminals to receive correspondingly-threaded sockets which carried an eraser-tip and a pencil has also been proposed; but the threaded sockets had no spring-fingers projecting therefrom, and in consequence there was no shifting-bearing upon such fingers by the tubular holder to regulate the clasp of the fingers, as in my device. In the well-known holder for adjustable leads or crayons the tubular receiver has a set of terminal spring-fingers fixed thereto and a cone-like cap movably mounted about said fingers and in threaded engagement with the shank of the fingers. By my invention the cap is entirely discarded, and the finger-shank, instead of being fixed, is made adjustable in the tubular receiver, so that the end of this latter bears directly against the fingers to accomplish what before required the use of the separate cap. These and all other like modifications within the skill of the mechanic to effect are equally within the spirit of the invention, which is not necessarily limited to the exact details hereinbefore set forth.

Having thus described my invention, what I claim as new, and desire to secure by Letters Patent, is—

1. In eraser-holders, the combination, with the tube, open at its end, of the spindle inserted movably therein and having the spring-fingers projecting therefrom beyond the tube-terminal to clasp the rubber, said tube and spindle being in threaded engagement with each other, whereby the tube may be shifted adjustably against the spring-fingers to regulate the grasp thereof, substantially as described.

2. In eraser-holders, the combination, with the threaded tube, open at its end, of the threaded spindle fitted movably therein, and having the outwardly-bent spring-fingers in piece therewith and projecting therefrom beyond the tube-terminal, the shifting engagement of said tube and spindle causing the tube to bear adjustably against the spring-fingers and regulate the grasp thereof upon the rubber, substantially as described.

3. As a new article of manufacture, an eraser-holder consisting of an open-ended tube having at one terminal a reversible plug furnished with a knife-blade, and threaded at its opposite terminal to engage with a threaded spindle having outwardly-bent spring-fingers projecting therefrom and beyond the tube-terminal to grasp the rubber, the screw-shift of said spindle and tube causing the tube end to bear adjustably against the fingers, substantially as described.

CHARLES A. HOLMES.

Witnesses:
JAMES H. PEIRCE,
GEO. P. FISHER, Jr.